(12) United States Patent
Opem et al.

(10) Patent No.: US 7,813,820 B2
(45) Date of Patent: Oct. 12, 2010

(54) METHOD TO INCREASE THE SAFETY INTEGRITY LEVEL OF A CONTROL SYSTEM

(75) Inventors: Audun Opem, Ski (NO); Mats Gunnmarker, Oslo (NO); Kai Hansen, Oslo (NO)

(73) Assignee: ABB AS, Billingstad (NO)

( * ) Notice: Subject to any disclaimer, the term of this patent is extended or adjusted under 35 U.S.C. 154(b) by 199 days.

(21) Appl. No.: 10/539,629

(22) PCT Filed: Dec. 16, 2003

(86) PCT No.: PCT/IB03/06021

§ 371 (c)(1), (2), (4) Date: Jan. 30, 2006

(87) PCT Pub. No.: WO2004/057430

PCT Pub. Date: Jul. 8, 2004

(65) Prior Publication Data

US 2006/0142873 A1    Jun. 29, 2006

(30) Foreign Application Priority Data

Dec. 19, 2002    (SE) .................................... 0203819

(51) Int. Cl.
*G05B 9/02*    (2006.01)
*G05B 11/01*    (2006.01)
(52) U.S. Cl. .......................................... 700/79; 700/21
(58) Field of Classification Search ................ 700/21, 700/79, 80
See application file for complete search history.

(56) References Cited

U.S. PATENT DOCUMENTS

| | | | |
|---|---|---|---|
| 6,201,997 B1 | 3/2001 | Giers | |
| 6,647,301 B1* | 11/2003 | Sederlund et al. | 700/79 |
| 6,898,468 B2* | 5/2005 | Ott et al. | 700/21 |
| 6,975,966 B2* | 12/2005 | Scott et al. | 702/183 |
| 7,286,886 B2* | 10/2007 | Klopfer et al. | 700/79 |
| 7,289,861 B2* | 10/2007 | Aneweer et al. | 700/110 |
| 7,337,369 B2* | 2/2008 | Barthel et al. | 714/43 |
| 2005/0071725 A1* | 3/2005 | Gibart | 714/755 |

FOREIGN PATENT DOCUMENTS

| | | |
|---|---|---|
| DE | 19857683 A1 | 6/2000 |
| DE | 10025085 A1 | 12/2001 |
| EP | 0905594 A1 | 3/1999 |
| GB | 2277814 A | 11/1994 |
| WO | WO 9323270 A1 | 11/1993 |

OTHER PUBLICATIONS

Andreas Schenk. "SIMATIC S7-400F/FH: Safety-Related Programmable Logic Controller". SAFECOMP 2000, LNCS 1943 (2000): 286-293.*

* cited by examiner

*Primary Examiner*—Ryan A Jarrett
(74) *Attorney, Agent, or Firm*—Venable LLP; Eric J. Franklin

(57) ABSTRACT

Controller capable of executing non-safety-related control logic. A safety module is added to the controller in order to increase the safety-integrity level of a control system. The controller is able to execute safety-related control of real-world objects. Such a control system may exist at an offshore production platform or in a hazardous area of a chemical plant.

18 Claims, 2 Drawing Sheets

METHOD TO INCREASE THE SAFETY INTEGRITY LEVEL OF A CONTROL SYSTEM

TECHNICAL FIELD

The present invention relates to supervision, diagnostic and diversity of execution of control algorithms in the context of control systems. A device comprises functionality, which adds security features to a controller and enables the controller to meet requirements for a safety-control system. Such a system needs diagnostic in order to ensure that no accidents take place which otherwise could harm people, equipment or the environment.

BACKGROUND ART

Industrial control systems are for instance applied in manufacturing and process industries, such as chemical plants, oil production plants, refineries, pulp and paper mills, steel mills and automated factories. Industrial control systems are also widely used within the power industry. Such industrial control systems may need to comprise or be combined with devices which add safety features. Example of processes which require additional safety features other than what a standard industrial control system provides are processes at offshore production platforms, certain process sections at nuclear power plants and hazardous areas at chemical plants. Safety features may be used in conjunction with safety shutdown, fire and/or alarm systems as well as for fire-and-gas detection.

The use of advanced computer systems in safety-related control systems raises challenges in the verification of correctness of large amount of software code and the complex electronics. There exists prior art, for instance described as standards, for how a higher safety level can be obtained for such systems. Such prior art is commonly focused on the process of the development of products, both the hardware part and the software parts. It also describes diagnostic functionalities and algorithms. Prior art also addresses the higher safety level obtained in executing control systems with different hardware redundancy and software diversity. The implementation of an advanced safety-control system is normally based on a dual or triple system with some type of voting before enabling an output signal. Some safety-control systems have implemented a sufficiently safe single unit solution by focusing on design of the system and highest possible quality in implementing such systems. Both multiple unit systems and single unit systems have today often included some number of diagnostic algorithms both in software and in hardware.

An example of an industrial control system, which includes a safety-critical function, is described in DE19857683 "Safety critical function monitoring of control systems for process control applications has separate unit". The system has a main controller bus coupled to different processors via a number of decentralized data receivers.

One example of a device in an industrial control system which has increased capability of fault detection is described in GB2277814, which concerns a fault tolerant PLC (Programmable Logic Controller) including a Central Programmable Unit (CPU). A pair of first I/O modules are connected between a positive power bus and a load. A pair of second I/O modules are connected between the negative power bus and the load. GB 2 277 814 further describes that power to the load is not disconnected upon failure of one of the I/O modules on either side of the load.

U.S. Pat. No. 6,201,997 describes a two-processor solution where both processors receive the same input data and process the same program.

SUMMARY OF THE INVENTION

The object of the invention is to enable an increased safety-integrity level of a Control System.

This object is met by a method to increase a safety-integrity level of a Controller for control of real-world objects, the steps attaching a safety-hardware unit, downloading software to a CPU of the Controller and the attached safety-hardware unit, configuring the attached safety-hardware unit to set the Controller's output values in a safe state for online control.

An advantage with the invention is that it increases the safety level for a control system based on a single controller unit to a level which previously was available mainly for dual or triple controller systems. The invention reduces the complexity of implementing and maintaining such control systems.

Another advantage with the invention is that a control system based on the invention and qualified for a high safety-level control may also be used for non-safety-critical process control by not using the added safety-hardware unit. The invention enables an increased flexibility in the use of the single-unit controller. This process control use of the single controller will then be a less costly and faster controller than the full safety level use of the control system. Since the plugable safety-hardware unit is not used for non-safety-critical control, a smaller amount of software in the single controller, compared with prior art, allows larger application software to execute faster.

Another advantage with the invention is that it enables that a Controller may reach an increased safety-integrity level at a time after that the Controller was originally installed for control of real world objects. As an example, a Controller may first be installed to perform non-safety-critical control and a year later the Controller is configured for an increased safety-integrity level for safety-critical control.

An additional advantage is the solutions obtained on how the user interfaces the plug-able unit. The user interface will be simplified so that, for instance, an engineer will specify the wanted level of safety integrity for the application.

Another object of the invention is to provide a Control System intended for safety-related control of real-world objects. The control system comprises a Controller with a single main CPU, and an attached safety-hardware unit comprising means to increase the safety-integrity level of the Control System.

BRIEF DESCRIPTION OF THE DRAWINGS

The present invention will be described in more detail in connection with the enclosed schematic drawings.

DESCRIPTION OF THE PREFERRED EMBODIMENTS

Figure 1:
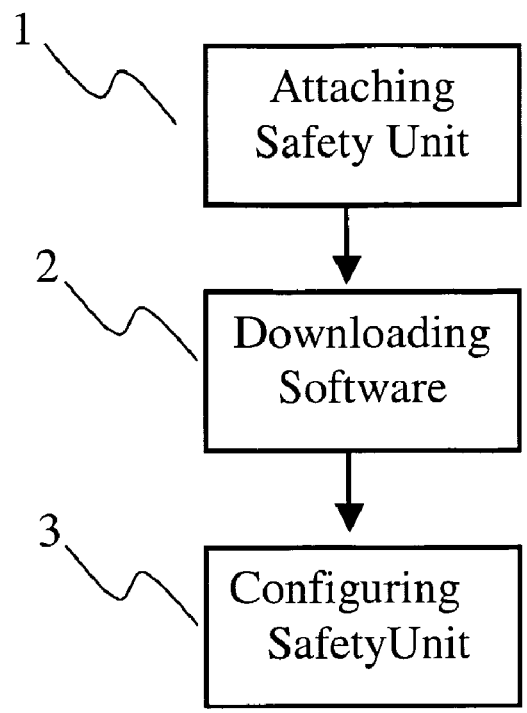
FIG. 1 shows an overview of a method according to the invention.

FIG. 1 shows an overview of a method according to the invention. The method provides an increased safety-integrity level of a Controller 10 such as an Industrial Controller of an Industrial Control System. Examples of a Controller is a Programmable Logic Controller (PLC) and a field controller.

In this description a Controller has the purpose of collecting measurements and controlling real-world objects connected to a Control System. Examples of real world objects are valves, motors, pumps, compressors, switchgear, conveyor belts, a product, a raw material, or a batch.

By safety-integrity level is meant a controller which meets de-facto standard safety-integrity levels or standard safety-integrity levels, such as SIL 1, SIL 2, SIL 3 or SIL 4 (SIL according to the standard IEC 61508 or later IEC standards).

FIG. 1 shows that the method comprises a step of attaching 1 a safety-hardware unit 11 (shown in FIG. 2) to the Controller 10. The safety-hardware unit 11 communicates with the Controller's CPU. The safety-hardware unit 11 may be in the form of a circuit board and typically comprises a CPU and may also comprise an Input/Output (I/O) interface. Such an I/O interface may comprise a set of memory chips and a Field Programmable Gate Array (FPGA). The Safety-Hardware Unit may also comprise local I/O channels such as Digital Output (DO) in order to provide forced output signals, for instance, to an external alarm system. Further, the Safety-Hardware Unit may include functionality for memory shadowing. One alternative name for the safety-hardware unit 11 is a safety module. The safety-hardware unit 11 comprises communication means 16 to communicate with the Controller's CPU via a bus 14. The safety-hardware unit 11 may be connected via a back-plane to the Controller 10. In an alternative embodiment, the safety-hardware unit 11 is a plug-able unit added to the main circuit board of the Controller 10, comprising the main CPU of the Controller 10.

Figure 2:
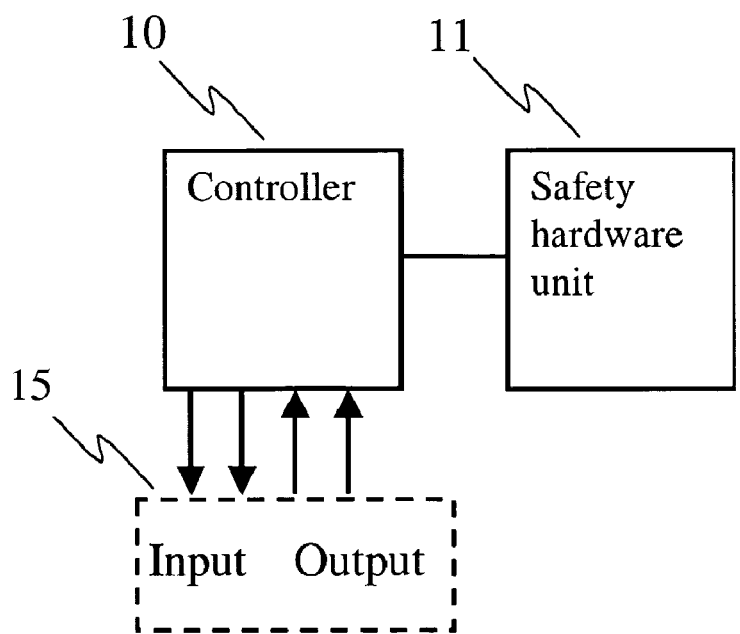
FIG. 2 shows a simplified diagram of a Controller with a local Input/Output and with an attached safety-hardware unit.

Further, FIG. 1 shows that the method comprises the step of downloading software with safety-related configuration data, not only to the Controller 10 shown in FIG. 2, but also to the attached safety-hardware unit 11. In one embodiment, the downloading of such software is made from a software tool connected to the Controller 10 from a computer device, such as a Personal Computer or Workstation. An example of configuration data is application classification depending on the previously mentioned safety standard. Configuration of communication capabilities between safety-related applications. Another example of such configuration data is application access level, which relates to user-authorization control.

Figure 4:
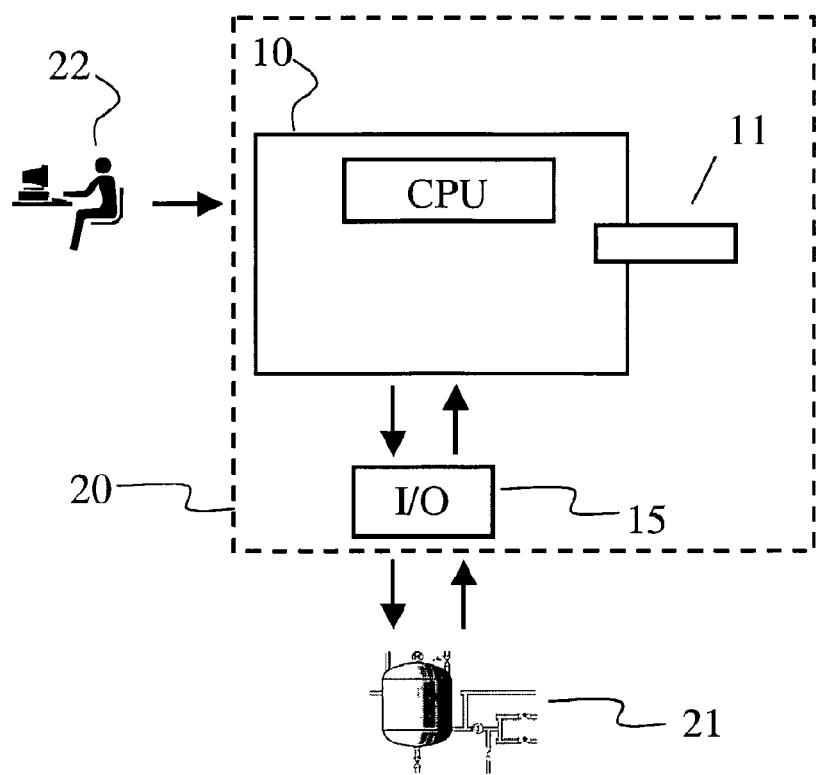
FIG. 4 shows an overview of a Control System comprising a Controller with an attached safety-hardware unit.

Another step of the method, shown in FIG. 1, is configuring the safety-hardware unit 11 to execute safety-function logic and set the Controller's 10 output values into a safe state for online safety control. This ensures that the Control System 20, shown in FIG. 4, goes into a safe state. To set the output values into a safe state is either made in an active way or in a passive way. The execution of the safety-function logic depends on the configuration data. The safety-function logic is written in a language well known to a person skilled in the art. Such a language may be according to IEC 6-1131 with possible extensions for safety-related functions.

The Controller 10 has the same control functionality for non-safety-related control both with and without the attached hardware unit 11. It should be appreciated that compared with prior art this enables more flexible technical solutions for safety control. As an example, the Controller 10 has the same set of program instructions available both with and without the attached hardware unit 11. An example of a program language is structured text as defined by IEC 6-1131. This means that a Controller 10, which originally is configured only for a non-safety-critical application, may at a later time be configured with the safety-hardware unit 11 mentioned above, and after being configured for online safety control the Controller 10 may still run the same non-safety-critical application as before adding the safety-hardware unit 11.

In an embodiment of the invention, a controller configuration and controller code is downloaded to the Controller 10. It is a user 22 of a software tool that initiates a download of the controller configuration and controller code. An example of a user is a process engineer, a service engineer or a process operator. During or after controller configuration and controller code are defined, a hardware unit diagnostic information is generated. In the embodiment, the diagnostic information is downloaded to the attached safety-hardware unit 11 and is intended for online diagnostic purposes.

FIG. 2 shows that a Controller referred to in the above described method, shown in FIG. 1, may obtain access to a plurality of input and output units directly connected to the Controller.

Figure 3:
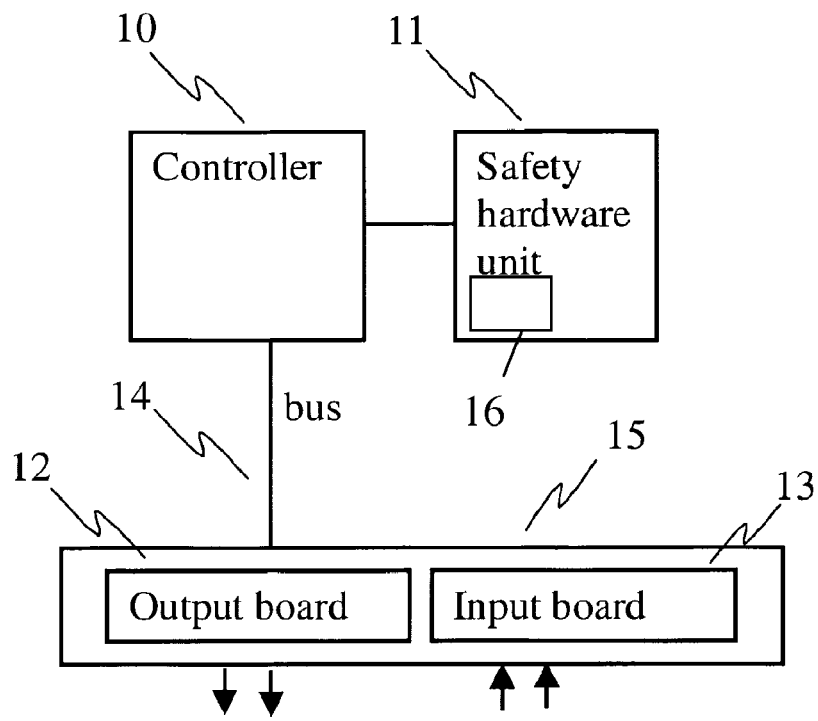
FIG. 3 shows a simplified diagram of the Controller with an attached safety-hardware unit with remote Input/Output connected by a bus solution.

FIG. 3 shows that a Controller referred to in the above described method, shown in FIG. 1, may obtain access to a plurality of input and output values of a real-world object through a bus connected between the Controller and to an input/output unit. In such an embodiment, the validity of the bus communication is verified in the attached safety-hardware unit 11. An example of such an input/output unit is a remote I/O. An example of a bus is a field bus. Another example of a bus is an internal bus of the Controller, such as a bus running on the backplane of the Controller 10.

It is an advantage if the bus verification logic is implemented in diverse. Further it is an advantage if in an embodiment of the invention the attached safety-hardware unit is diverse generating a safety-related header for the bus communication.

In order to further improve the reliability and diagnostics of the Control System, the Input/Output unit 15 may comprise two diverse implementations each verifying the correctness of the bus traffic and each generating a safety-related header for the bus 14 communication.

Further, in an embodiment of the invention the timing supervision of the Controller 10 is verified in the attached safety-hardware unit 11. An embodiment of the invention may also comprise verifying the correct sequence of logic in the attached hardware unit 11. Further an embodiment may comprise verifying the correct download of new control functionality logic in the attached hardware unit 11. Such a verification may, for instance, involve a test of a check-sum.

It is beneficial to allow only users logged on as safety-classified users to modify the control functionality logic and parameters. Such a classification may be verified in the Control System by means of a user key.

The safety-hardware unit 11 may be configured to run as a slave of the Controller 10. That means that a safety-function logic executing in the safety-hardware unit is triggered from the Controller. The safety-hardware unit supervises that that it is triggered at a defined time.

In another embodiment, the safety-hardware unit 11 may comprise a first and a second module in a redundant configuration. The second module is typically updated with data from the first module and the second module takes over the safety-related control of the control system from the first module if a failure of the first module is detected. The Controller may have a redundant CPU unit, which takes over control of real-world objects from the primary CPU unit in the case of a failure of the primary CPU unit. The redundant CPU establishes communication with the first or second module of the attached safety-hardware unit.

Another embodiment of the invention is a Control System 20 intended for safety-related control of real world objects. Such a Control System comprises a Controller 10 with a single main CPU and an attached safety-hardware unit 11 comprising means to set the Controller's output values in a safe state for online safety control.

The invention claimed is:

1. A method to increase a safety integrity level of a single controller for control of real world objects, the method comprising:

attaching to the single controller a safety-hardware unit wherein the safety-hardware unit communicates with a central processing unit of the single controller, wherein the safety-hardware unit is used only for safety-critical control, connecting a bus to the single controller and connecting an input/output unit to the bus, downloading safety-related configuration data and/or diagnostic information to the attached safety-hardware unit and downloading a control function software to the single controller, configuring the attached safety-hardware unit to execute logic, which depends on the downloaded safety-related configuration data and/or diagnostic information, actively or passively setting output values of the single controller to a safe state for online safety control, obtaining access to a plurality of input and output values of a real world object through the bus, and verifying a validity of bus communication with the attached safety hardware unit.

2. The method according to claim 1, wherein the single controller has the capability of executing a set of non-safety critical control functions, which set of non-safety critical control functions is the same before as well as after the safety hardware unit is attached.

3. The method according to claim 2, wherein the configuring comprises:

downloading to the attached safety hardware unit diagnostic information, which previously was automatically generated by a software tool as a result of user's configuration of the single controller and which diagnostic information is used in the attached safety hardware unit during safety critical control.

4. The method according to claim 1, wherein the timing supervision of the controller is verified in the attached safety hardware unit.

5. The method according to claim 1, wherein correct sequence of code logic is verified in the attached safety hardware unit.

6. The method according to claim 1, wherein correctness of memory content of the controller is verified in the attached safety hardware unit.

7. The method according to claim 1, wherein a download of new control functionality logic to the controller is verified in the attached safety hardware unit.

8. The method according to claim 1, wherein the attached safety hardware unit performs checks in order to allow only users logged on as safety classified engineers and safety classified operators to modify the control functionality logic and parameters.

9. The method according to claim 1, wherein a bus communication verification logic in the attached safety hardware unit is implemented diverse.

10. The method according to claim 1, wherein the attached safety hardware unit is diverse generating a safety related header for the bus communication.

11. The method according to claim 10, wherein the input/output unit has two diverse implementations each verifying the correctness of the bus traffic and each generating a safety related header for the bus communication.

12. The method according to claim 1, wherein the attached safety hardware unit comprises a first and a second module in a redundant configuration, the second module is updated with data that exists first module at the time of a failure and the second module takes over the safety related control of the control system from the first module if a failure of the first module is detected.

13. The method according to claim 12, wherein a redundant controller unit is attached to the single controller, wherein the redundant controller takes over in case of a failure of a primary controller, and wherein the redundant controller unit establishes communication with either the active first module or the active second module of the attached safety hardware unit.

14. A single or 1-channel control system intended for safety-related control of real-world objects, comprising:

a single main central processing unit handling main processes of a single controller, the single controller comprising a bus configured to obtain access to a plurality of input and output values of a real world object, the single controller further comprising a central processing unit, wherein the single controller is configured to download a control function software, and wherein the single controller is configured such that output values may be actively or passively set to a safe state for online safety control, a safety-hardware unit attached to said single controller, the safety-hardware unit comprising means to increase a safety-integrity level of the single controller and comprising means to set output values of the single controller in a safe state for online safety control, wherein the safety-hardware unit communicates with the central processing unit of the single controller, wherein the safety-hardware unit is used only for safety-critical control, herein the safety-hardware unit is configured to download safety-related configuration data and/or diagnostic information, wherein the safety-hardware unit is configured to execute logic that depends on the downloaded safety-related configuration data and/or diagnostic information, and wherein the safety-hardware unit is configured to verify a validity of bus communication, and an input/output unit connected to the bus of the single controller.

15. The control system according to claim 14, wherein the single controller has the capability of executing a set of non-safety critical control functions, which set of non-safety critical control functions is the same before as well as after the safety hardware unit is attached.

16. The control system according to claim 15, further comprising:

means for downloading to the attached safety hardware unit diagnostic information, which previously was automatically generated by a software tool as a result of user's configuration of the controller and which diagnostic information is used in the attached safety hardware unit during safety critical control.

17. The control system according to claim 15, wherein a bus communication verification logic in the attached safety hardware unit is implemented diverse.

18. The control system according to claim 17, wherein the attached safety hardware unit is diverse generating a safety related header for the bus communication.

* * * * *